United States Patent [19]

Groves et al.

[11] Patent Number: 5,555,400

[45] Date of Patent: Sep. 10, 1996

[54] METHOD AND APPARATUS FOR INTERNAL CACHE COPY

[75] Inventors: Randall D. Groves; John T. O'Quin, II, both of Austin, Tex.

[73] Assignee: International Business Machines Corporation, Armonk, N.Y.

[21] Appl. No.: 385,217

[22] Filed: Feb. 8, 1995

Related U.S. Application Data

[63] Continuation of Ser. No. 950,351, Sep. 24, 1992, abandoned.

[51] Int. Cl.$^6$ .................................................... G06F 12/02
[52] U.S. Cl. .................. 395/492; 395/445; 364/DIG. 1; 364/243.41; 364/260.2
[58] Field of Search ............................. 364/200 MS File, 364/900 MS File; 395/400, 425, 403, 440, 444, 445, 449, 450, 452, 453, 460, 492

[56] References Cited

U.S. PATENT DOCUMENTS

| | | | |
|---|---|---|---|
| 4,028,675 | 6/1977 | Frankenberg | 395/425 |
| 4,400,770 | 8/1983 | Chan et al. | 395/400 |
| 4,797,814 | 1/1989 | Brenza | 395/425 |
| 5,170,476 | 12/1992 | Laakso et al. | 395/425 |
| 5,179,682 | 1/1993 | Jensen | 395/425 |
| 5,197,144 | 3/1993 | Edenfield et al. | 395/425 |
| 5,226,169 | 7/1993 | Gregor | 395/800 |
| 5,261,066 | 11/1993 | Jouppi et al. | 395/425 |
| 5,276,848 | 1/1994 | Gallagher et al. | 395/425 |
| 5,313,609 | 5/1994 | Baylor et al. | 395/425 |
| 5,313,613 | 5/1994 | Gregor | 395/425 |
| 5,317,704 | 5/1994 | Izawa et al. | 395/400 |

FOREIGN PATENT DOCUMENTS

| | | |
|---|---|---|
| 0280954 | 9/1988 | European Pat. Off. . |
| 0375883 | 7/1990 | European Pat. Off. . |
| 0383097 | 8/1990 | European Pat. Off. . |

OTHER PUBLICATIONS

"Synonym Avoidance Cache", IBM Technical Disclosure Bulletin, vol. 34, No. 1, Jun. 1991, pp. 377–381.
"IBM RISC System/6000 Technology", IBM Corp., 1990, order No. SA23-2619.

*Primary Examiner*—Eddie P. Chan
*Assistant Examiner*—Hiep T. Nguyen
*Attorney, Agent, or Firm*—Casimer K. Salys

[57] ABSTRACT

A method and apparatus for improving data processing system performance having a cache. Data from one cache line is easily and quickly copied to another cache line within the cache. In the preferred embodiment, this copy cache line operation is initiated using an opcode of a central processing unit's instruction set. Thus, software running on the data processing system can invoke this cache line copy by executing this CPU instruction.

Another feature is the ability to rename a cache line, again using a CPU instruction to initiate the operation. This provides a logical copy of the cache data without having to perform a physical copy.

12 Claims, 5 Drawing Sheets

METHOD AND APPARATUS FOR INTERNAL CACHE COPY

This is a continuation of application Ser. No. 07/950,351 filed Sep. 24, 1992, now abandoned.

TECHNICAL FIELD

This invention relates generally to the field of computers and data processing systems, and more particularly to the area of memory access and control. Specifically, the invention relates to a mechanism for cache manipulation in a data processing system.

BACKGROUND ART

In a data processing system with storage hierarchy, selected lines of data in main storage are copied in a high speed buffer, often called a cache, for fast access by a processor. Whenever the processor requests data, or needs an instruction to execute, the system first checks the cache to determine whether the data or instruction is available in the cache. If it is, the data/instruction is quickly provided to the processor. If it is not available, the data/instruction is retrieved more slowly from main memory. A portion of the untranslated logical address in each processor request is often used to directly access the cache directory, rather than use a translated absolute address, because system performance is significantly reduced by waiting for the translated address of the data/instruction. A representative cache system is described in commonly owned U.S. Pat. No. 5,113,508, to Groves et al, and hereby incorporated by reference and "IBM RISC SYSTEM/6000 Technology", First Edition, 1990, IBM order number SA23-2619, and hereby incorporated by reference as background material.

Cache synonyms are created by the use of untranslated logical addresses to access the cache. A given data/instruction item may exist in multiple locations within the cache and can be accessed by more than one name. As described in U.S. Pat. No. 4,400,770 and U.S. Pat. No. 4,797,814, both incorporated here by reference, synonyms provide flexibility when multiple processes may be accessing a given cache line with dissimilar logical (virtual) addresses, or the ability exists to access a cache line with either a logical (virtual) or a physical (real) address at any given instant.

As a result of such synonym usage, various schemes such as those described by Brenza, J. G., in the IBM Technical Disclosure Bulletin, June 1991, pp 377–381, and hereby incorporated by reference as background material, were designed to avoid the possibility of cache synonyms having entries to dissimilar cache line locations.

However, the prior art has not addressed the need or desire to efficiently copy or move data, within a cache, from one cache line to another. This capability would improve system throughput in the management of cache by eliminating the requirement to execute multiple load/stores from main memory to copy or move data, creating duplicate entries in the cache and creating extra traffic between the cache and main memory.

Nor has the prior art addressed the ability to easily rename a cache line in a cache directory. This ability would be desirable to logically copy data items, a cache line at a time, while only using one cache line.

SUMMARY OF THE INVENTION

It is thus an object of the present invention to improve overall system performance of a data processing system.

It is another object of the present invention to improve memory access latency in a data processing system.

It is yet another object of the present invention to provide an improved method for managing a cache in a data processing system.

It is yet a further object of the present invention to improve cache performance in a data processing system.

It is another object of the present invention to minimize cache reloads from main memory.

It is yet another object of the present invention to improve the hit ratio in a data processing system cache.

This invention provides a method and apparatus for improving data processing system performance having a cache. Data from one cache line is easily and quickly copied to another cache line within the cache. In the preferred embodiment, this copy cache line operation is initiated using an opcode of a central processing unit's instruction set. Thus, software running on the data processing system can invoke this cache line copy by executing this CPU instruction.

Another feature is the ability to rename a cache line, again using a CPU instruction to initiate the operation. This provides a logical copy of the cache data without having to perform a physical copy.

BEST MODE FOR CARRYING OUT THE INVENTION

Figure 1:
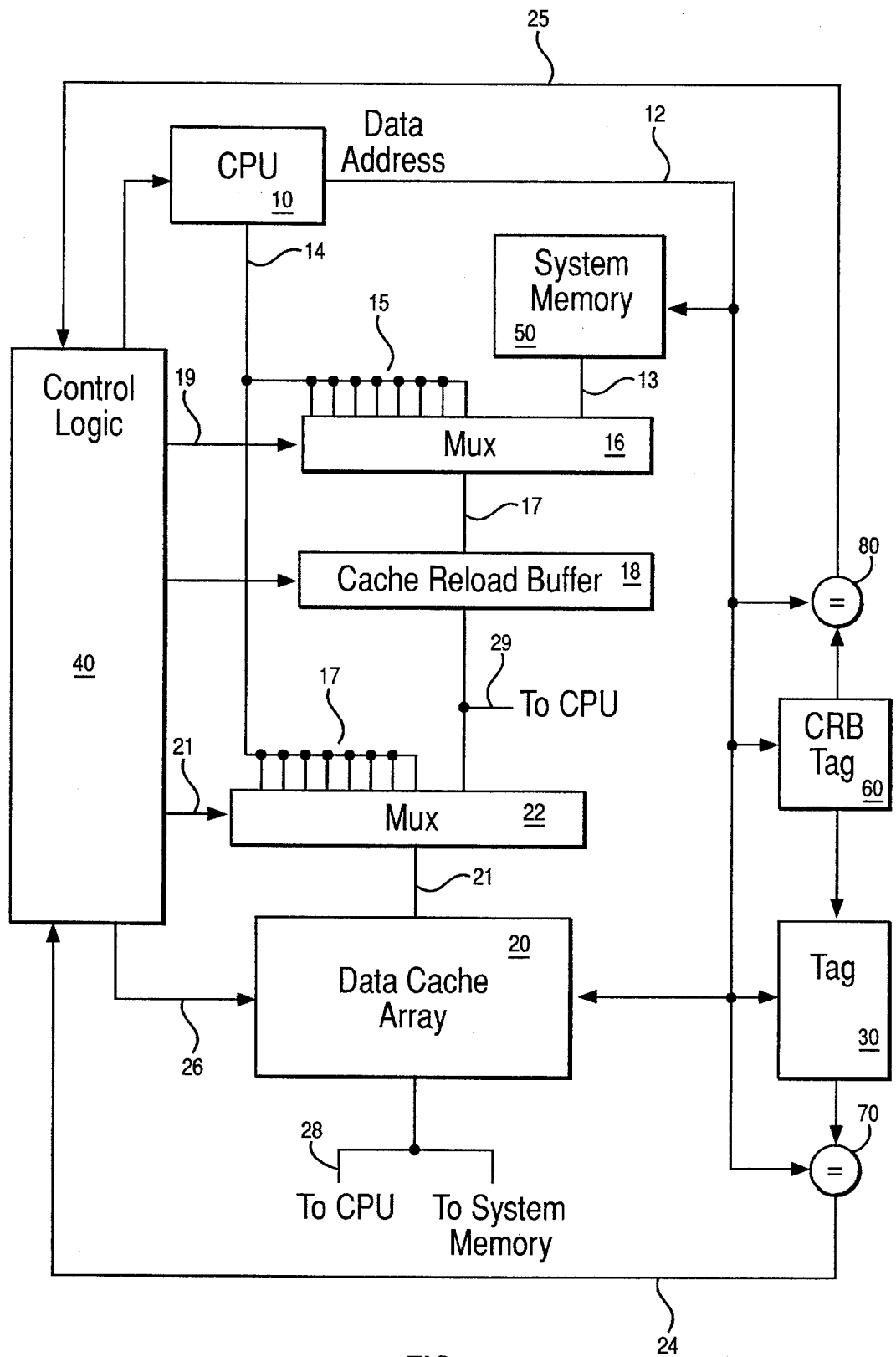
FIG. 1 shows the system data flow for a data processing system having a cache.

There are several operations in the AIX[1] kernel that are very sensitive to the speed of copying data (AIX is a particular IBM version of the popular UNIX[2] operating system which was developed by AT&T and the University of Berkeley). A very important one of these operations is the 'fork' system call. This system call "spawns" a child process, which executes concurrently with the parent process. The child process requires its own copy of the parent's data areas. A variety of schemes have been used to reduce the actual amount of actual copying required such as 'copy-on-read' and 'copy-on-write' schemes used in AIX and Mach respectively. Even with those optimizations, copying of pages still requires a measurable amount of system time, so a method for copying pages more efficiently is highly desirable.

[1]AIX is a trademark of International Business Machines Corporation
[2]UNIX is a trademark of Unix System Laboratories, Inc.

One very efficient method is to provide a "copy data cache line" instruction. Even if slow, this instruction is significantly faster than any of the current ways to copy a page. The following compares the number of bytes per cycle that a representative data processing machine can copy.

| bytes/cycle | machine |
| --- | --- |
| 2 | RS/6000 Model 530 - fixed point |
| 4 | RS/6000 Model 530 - floating point |

Therefore, a 4 cycle copy cache line would move data twice as fast as using the floating point registers (assuming 32 bytes/cache line).

The copy cache line instruction would not fetch the 'to address' from memory. This is an additional performance advantage in that it saves at least half of the cache misses, and thus improves the hit ratio.

There are three known options to implementing a cache line copy in a RISC processor:

1) Have an instruction which has two memory addresses, RA+RB and (RA+1)+RB, one which points to the source and one to the destination (where RA+1 means the register immediately after RA). This has a simple interface to software and is generally useable, but is very complicated to implement since no other RISC instructions have two memory addresses.

2) Define a new special register which contains either the source or target memory address in it and define a new instruction which copies from/to RA+RB to/from the address in the special register. This is similarly complicated to implement. Additionally, software must worry about how to handle this new register (i.e. the register either becomes a new part of the process state or is it a serially useable register that requires this code to run with interrupts disabled).

3) Define two new privileged instructions. The first is Data Cache Move to Reload Buffer (or dcmtrb). The second is Data Cache Rename Reload Buffer (or dcrrb). The Cache Reload Buffer (or CRB) is an implementation register which acts like a one line additional set in the Data Cache containing the line currently being reloaded. By exposing it to software in this way, the copy cache line function can be performed in software.

The preferred embodiment for implementing a data cache move and rename will now be described. Referring to FIG. 1, a standard central processing unit (CPU) 10 generates address and data signals on a bus 12. This bus interconnects the CPU 10 with system memory 50, a data cache array 20, a tag array 30, a CRB tag array 60, as well as tag matching logic 70 and CRB tag matching logic 80. The CPU 10 is further connected via bus 14 to a mux 16 for accessing a cache reload buffer 18 (CRB), and to a mux 22 for accessing the data cache array 20. The particular instances for these accesses by the CPU to the cache reload buffer and the data cache array will be further described below.

The data cache array 20 is a conventional array of high speed read/write memory, as known to those of ordinary skill in the art, used for a data cache for CPU 10. A cache reload buffer 18 is used to buffer data from system memory 50 until a complete cache line (32 bytes in the preferred embodiment) of data is ready to be written into the cache. The tag array 30 contains one entry per cache line in the data cache array 20 comprising the value of the system memory address for a given cache line location. The CRB tag 60 is a buffer for temporarily storing the address corresponding to the data in the cache reload buffer 18 which is to be written in the data cache array 20. The value stored in the CRB tag 60 is transferred to the corresponding location in the tag array 30 when the data in the cache reload buffer 18 is transferred into a location within the data cache array 20. This data transfer between the CRB tag array 60 and the tag array 30, as well as the data transfer between the cache reload buffer 18 and the data cache array 20, will be further described below in reference to FIGS. 2–5.

Control logic 40 controls the overall data flow depicted in FIG. 1, and is coupled to the CPU 10, the CRB mux 16, the CRB 18, the data cache array mux 22, and the data cache array 20. The control logic is further coupled to the tag equate logic 70 and CRB tag equate logic 80 for detecting when a match occurs between an address presented on the bus 12, and that stored in either the tag array 30 or the CRB tag array 60.

In a traditional cache system, the CPU 10 accesses data via bus 12. For performance improvements, a cache 20 is used to quickly provide the CPU 10 with data. The cache provides a localized copy of a portion of data which resides in system memory 50. The cache comprises data near, or adjacent to, data which has recently been accessed by the CPU 10 in preceding CPU instructions. Thus, the probability is high that the next data accessed by the CPU will reside in the cache 20 (which has a relatively fast access time), rather than only residing in the system memory 50 (which has a relatively slow access time).

When the CPU 10 places an address on the bus 12 to read data from such address, tag equate logic 70 determines whether the address matches the address of a cache line currently in the data cache array by comparing with the addresses in the tag array 30. As this tag array comprises address values for the corresponding data lines stored in the cache, this tag equate logic 70 can compare the address presented on the bus 12 with those values stored in the tag array 30. If a match is found, meaning the data cache array 20 contains the data item sought by the CPU 10, the CPU retrieves the requested data from the cache 20. This is shown by the tag equate logic 70 signalling at 24 the control logic 40 that a match was detected. The control logic then enables at 26 the cache array 20 to transfer the requested data contained therein to the CPU 10 at 28. If no match is found, meaning the data cache array does not contain the data item sought by the CPU 10, a check is made at 80 to ensure that the requested data has not already been buffered in the CRB 18, waiting to be stored into cache 20 (as described below in reference to FIG. 2). This is done by comparing the address on bus 12 with the value stored in the CRB tag 60. The results of the check are transferred at 25 to the control logic 40. If a match is detected, the control logic 40 causes the data from the CRB 18 to be transferred to the CPU 10 at 29. If no match is detected by 80 or 70, a miss occurs. This means that a cache line must be loaded into the data cache with data from system memory 50. A cache line contains more than the actual data requested, as the odds are that the adjacent or nearly adjacent data will be subsequently requested from the CPU. Thus, the cache line is loaded with not only the actual data requested, but adjoining bytes/words of data stored in system memory 50 as well. Again, this need for loading a cache line (because of a miss) is detected using the tag equate logic 70 and 80, which signals at 24 and 25 to the control logic 40 that no address stored in tag array 30 or CRB tag array 60 equates with the address being presented on bus 12. At this point, data is read from system memory 50 along path 13, through mux 16 as controlled by control logic 40, into the cache reload buffer 18 along path 17. This cache reload buffer is used to buffer data being received from system memory 50 until a complete cache line worth of data is available to store into the data cache array 20 along path 21. When the CRB 18 is full, the control logic 40 enables the cache multiplexor 22 to load data from the CRB into the particular location in the cache 20. This may occur during the next available cycle, or be deferred until a subsequent cache miss occurs, as will now be discussed.

Figure 2:
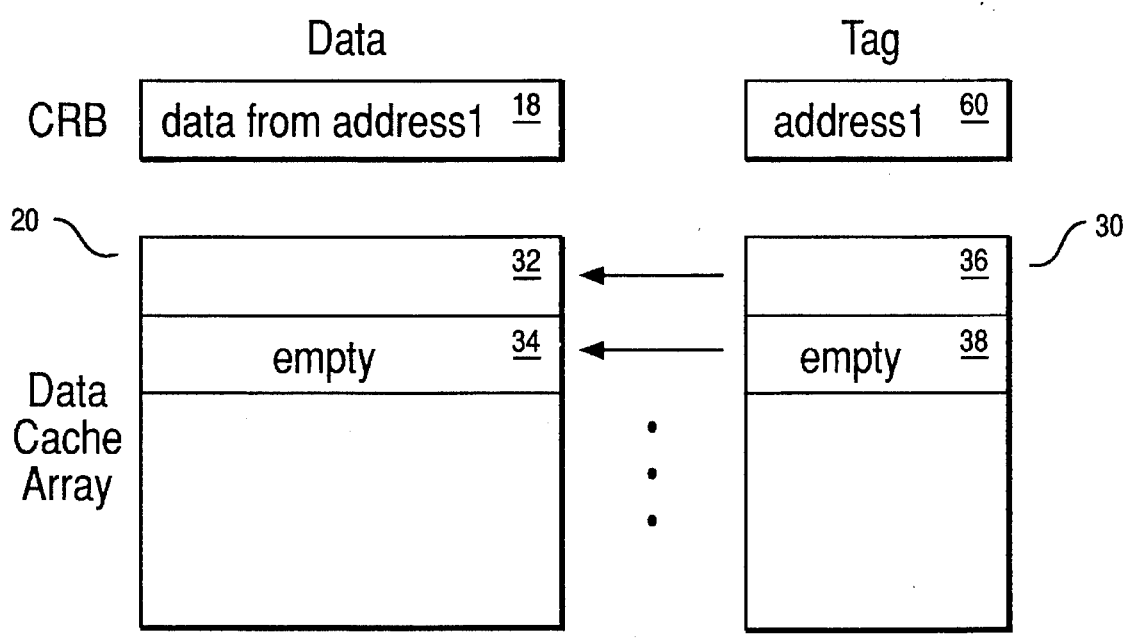
FIG. 2 shows the state of a cache and corresponding tag after a load miss has occurred.

Reference is now made to FIG. 2, which depicts one method for cache operation during a load miss from address1. Again, a load miss means that the CPU 10 was attempting to load data from address1, and this data is not currently in the data cache array 20, but rather is in the slower system memory 50 (of FIG. 1). Thus, the data cache array 20 must be replenished with the data from system memory 50. FIG. 2 shows the CRB 18, the data cache array 20, the CRB tag 60, and the tag array 30. The CRB 18 contains a line of data to be stored into the cache 20. This cache array 20 is a multidimensional array, such that multiple lines of data can be stored therein, such as at locations 32 and 34. Each location contains a complete cache line in the preferred embodiment. However, other configurations, such as requiring 2 or more locations for a full cache line, would also be possible without departing front the scope and spirit of this invention. The CRB tag 60 contains the address (address1) to be loaded into the tag array This address corresponds to the data then existing in the CRB 18. The tag array 30 contains multiple locations, such as 36 and 38, where addresses are stored which correspond to the data stored in the cache array 20. For example, the data stored in cache line at 32 has an address which is stored in tag array 30 at 36. As depicted in FIG. 2, a line of data at address1 (which has been requested by the CPU 10) is buffered in the CRB at 18. Address1 is buffered in the CRB tag buffer 60. This data and address information will be stored into the corresponding array 20 and tag locations 30. The information is stored either in an empty location 34 and 38, or a least recently accessed location if no empty locations exist. In one embodiment, the transfer of the data and address to the cache and tag does not occur until the CRB 18 and CRB tag 60 are required by a subsequent load or store miss. In an alternate embodiment, the CRB data and CRB tag could be transferred into the cache array and tag during a system cycle not requiring access to the cache, thus reducing delays in system throughput.

Returning to FIG. 1, a CPU store operation will now be described. When CPU 10 initiates a store operation, the tag 30 and CRB tag 60 must be checked against the address on bus 12 using logic 70 and 80 in a manner similar to that described above with reference to a load operation. The control logic 40 directs mux 22 at 21 to store the data from the CPU into data cache array 20 through data path 14 and 17, when a cache hit is detected in tag 30 (meaning an address match was found in tag 30, and the cache 20 contains a copy of the data being written). The control logic 40 directs mux 16 at 19 to store the data from the CPU into the CRB 18 through data path and 15, when a cache hit is detected on the CRB tag 60 (meaning an address match was found in CRB tag 60, and the CRB 18 contains a copy of the data being written). If there is not a hit to either the tag 30 or CRB tag 60, a store miss occurs.

Figure 3:
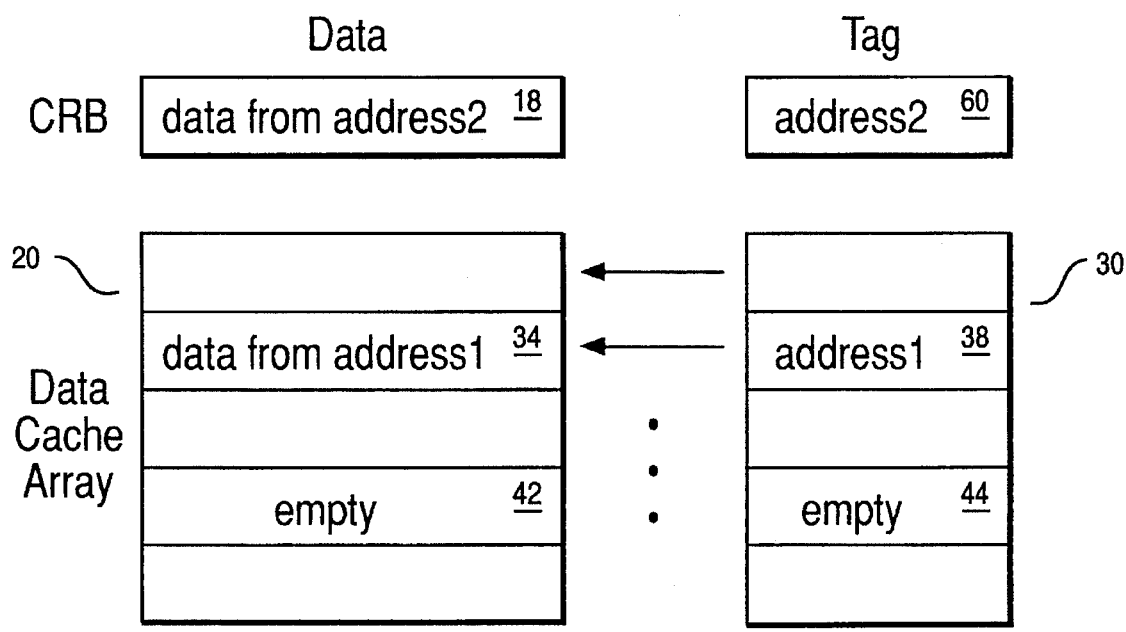
FIG. 3 shows the state of a cache and corresponding tag after a store miss has occurred.

FIG. 3 depicts a store miss to address2. A store miss means that the CPU 10 initiated a data store to address2, but neither the cache 20 nor CRB (which is an extension of the cache 20) contain a local copy of address2 data.

The data previously loaded from address1 has been transferred into the cache array 20 at 34, with a corresponding tag entry at 38. The data to be stored at address2 is temporarily resident in the CRB 18, with corresponding CRB tag 60. An empty, or least recently used, location exists in the cache array at 42, with corresponding tag location 44.

Figure 4:
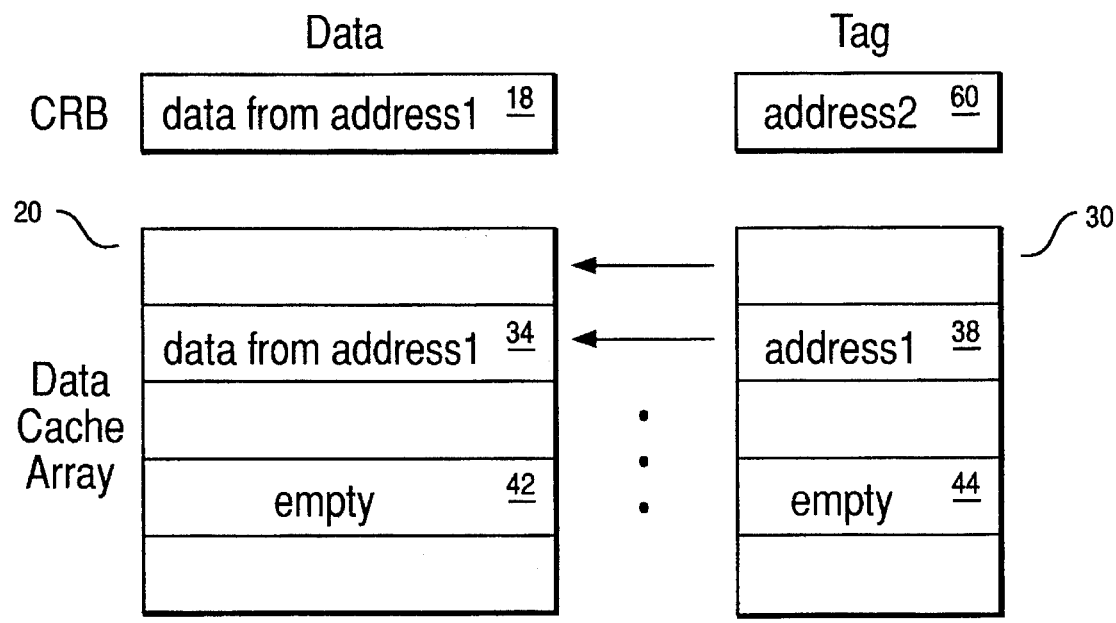
FIG. 4 shows the state of a cache and corresponding tag after a load/store sequence of CPU instructions has occurred.

Referring now to FIG. 4, the cache array 20 contains data from address1 at 34. This data resulted from a previous load command (similar to that described above with reference to FIG. 2). A corresponding tag address for this cache line 34 is stored at 38. As the load/store operations for copying a page of data from address1 to address2 are typically in close proximity to one another in the stream of CPU instructions being executed, and the use of the CRB 18 to buffer the cache line prior to storage into the cache array 20, the instruction sequence will load the data from address1 and store that data to address2 resulting in the situation depicted in FIG. 4. The CRB 18 will contain the data from address1 as the result of the store instructions to copy the data. This occurrence is not unusual, as a sequence of load/stores using the same data occurs when a page of data is being copied from one location (e.g. address1) to another location (e.g. address2). This need for copying pages occurs frequently in a Unix operating system, when a system fork operation occurs. A child is spawned by this fork, and requires a duplicate copy of the environment which the parent maintained prior to the fork operation.

Figure 5:
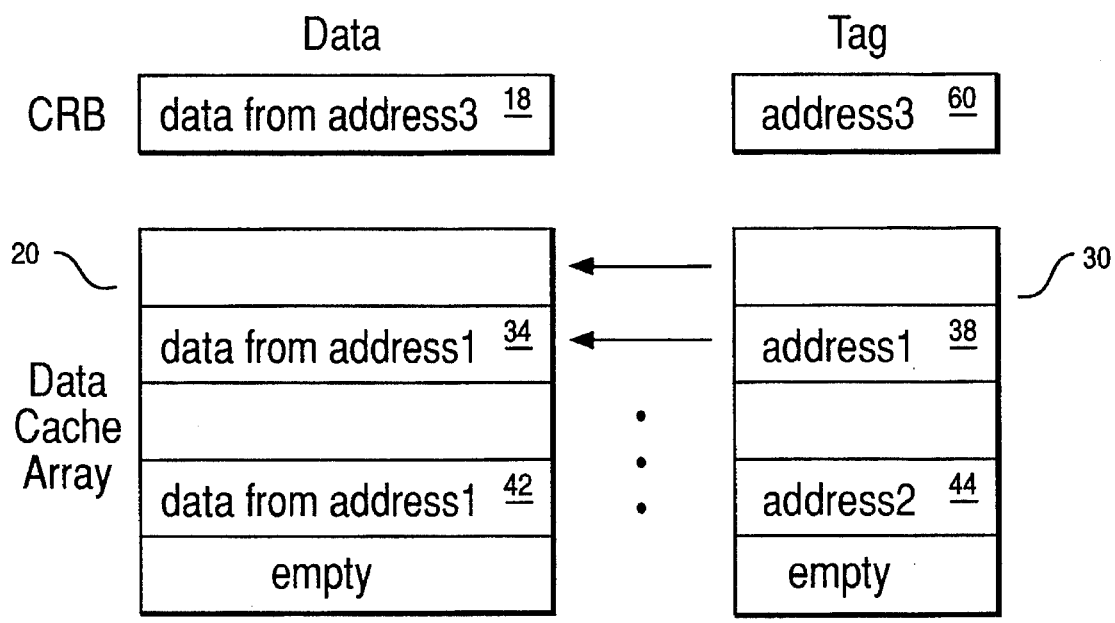
FIG. 5 shows the state of a cache and corresponding tag, after a load/store sequence of CPU instructions, followed by a miss has occurred.

FIG. 5 shows the results of FIG. 4 when the CRB and CRB tag information have been transferred to the cache array 20 and cache tag 30 as a result of a miss to address3 (prompting the use of the CRB to load the cache with the miss data). As can be seen, this results in a copy of data being stored in the cache array at both locations 34 and 42 (see FIG. 5). Further, additional system cycles were required to transfer the data from address2 even though it was subsequently replaced by the data from address1 by the store instructions.

This approach represents the current state of the art for copying pages in systems like the RISC System/6000. This has two obvious disadvantages: 1) The copied data occupies two lines within the data cache array, making less efficient use of the data cache and increasing cache miss rates, and 2) The data from address2 is unnecessarily copied into the CRB 18, thus wasting system memory bandwidth and CPU cycles.

Figure 6:
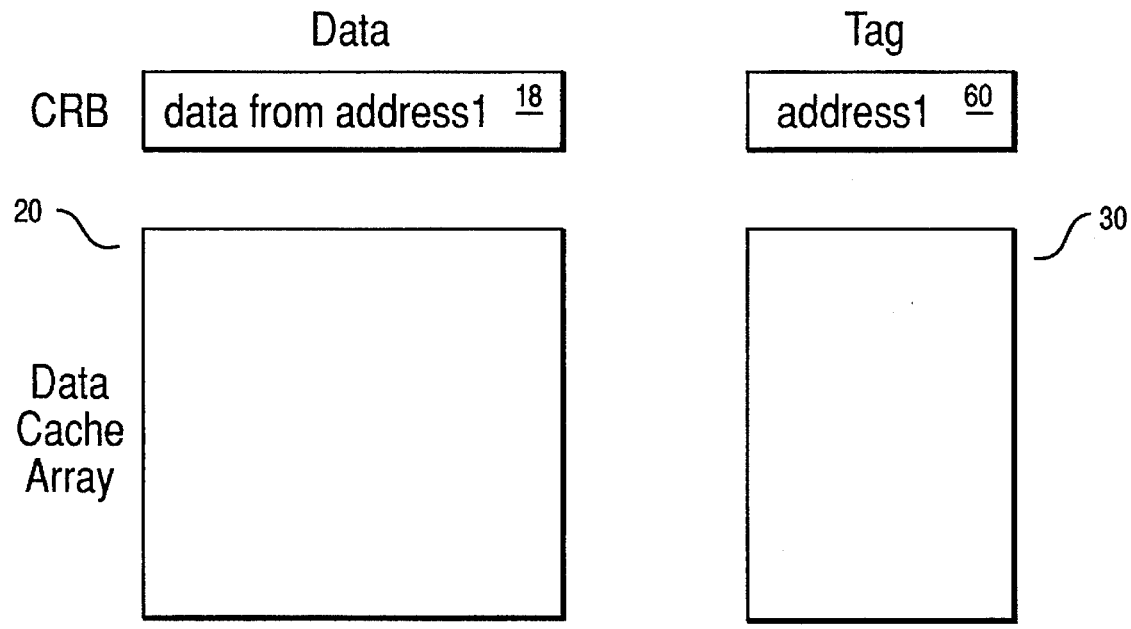
FIG. 6 shows the state of a cache, and corresponding tag, after a load miss has occurred.

Referring now to FIG. 6, a miss caused by the execution of a dcmtrb instruction similar to that depicted in FIG. 2 is shown. Data from address1, which did not previously exist in the cache, has been buffered into the CRB 18, and has an address of address1 stored in the CRB tag 60. The dcmtrb instruction does not require the creation of an empty slot in the data cache array 30 by selecting the least recently used cache line since the dcmtrb instruction indicates that this entry will not be transferred into the data cache array 30, thus saving one line in the cache.

Figure 7:
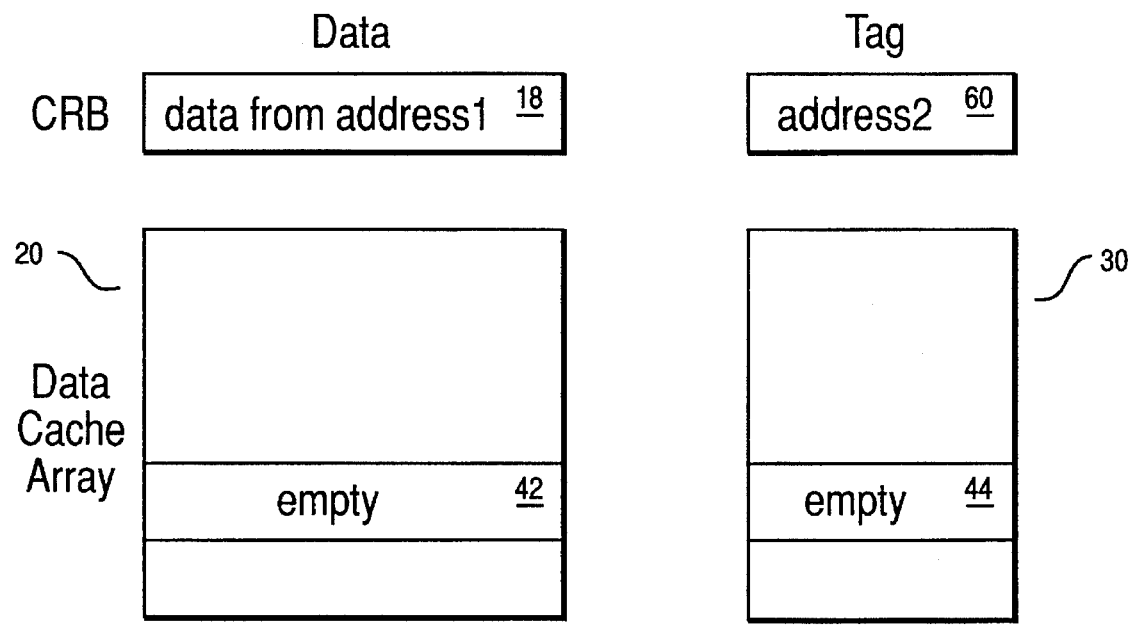
FIG. 7 shows the state of a cache, and corresponding tag, after a rename CRB instruction has occurred.

The results of executing a dcrrb instruction can now be fully appreciated with regards to FIG. 7. As opposed to the previous load/store sequence used to copy a page of data, the dcrrb instruction alloys for merely modifying the address value stored in CRB tag 60. This subsequent operation to the CRB did not result in having to load the data from address2 into the CRB, thus saving memory bandwidth.

Figure 8:
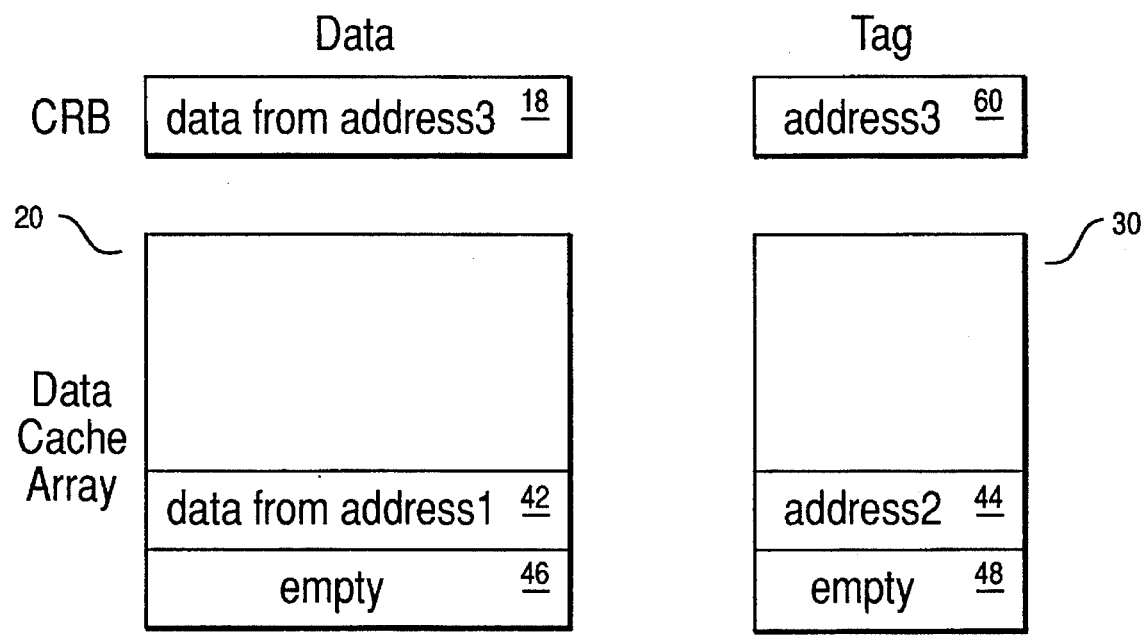
FIG. 8 shows the state of a cache, and corresponding tag, after a load/rename sequence of CPU instructions, followed by a miss, has occurred.

Finally, the results of providing this dcmtrb/dcrrb pair are even more apparent with regards to FIG. 8 in comparison to FIG. 5. FIG. 8 shows how the CRB and CRB tag information from FIG. 7 have been transferred into the cache array 20 and tag 30 as a result of a miss to address3 (which thus prompting use of the CRB and triggered the transfer). The data from address1, which was in the CRB at 18 of FIG. 7, has now been moved to the cache array 20 at cache line 42. The corresponding address (address2), which was in the CRB tag at 60 of FIG. 7, has now been moved to the tag array 30 at location 44. Locations 46 and 48 remain empty, ready to receive the data and address from address3. A duplicate copy of the data from address1 (34 of FIG. 5) does not exist using this approach, greatly improving the utilization of the cache by eliminating such duplication of data. As overall system performance is greatly impacted by the size of cache arrays, and since cache's are relatively expensive in relation to system memory, due to fast access requirements, the cost/performance of systems using this approach will be greatly enhanced.

Figure 9:
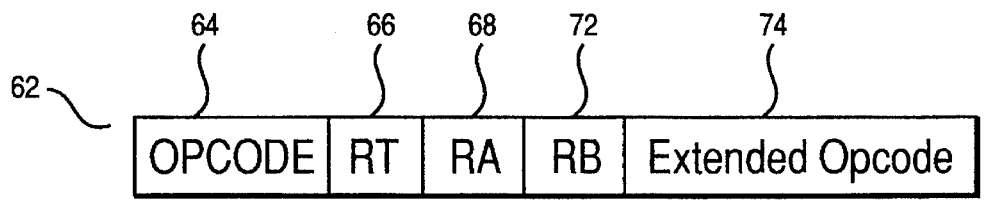
FIG. 9 shows the format of a dcmtrb and dcrrb instruction.

Now that the hardware flow has been described, the software operations used to drive the hardware are now described. An instruction called Data Cache Move to Reload Buffer (dcmtrb) is provided to move data to the cache reload buffer. Referring now to FIG. 9, an instruction 62 has an opcode 64, a temp register 66, register A 68, register B 72 and extended opcode 74. For an instruction 62 having a dcmtrb opcode 64, the address of a cache line to be moved into the CRB is computed by adding the contents of register A (RA) 68 and register B (RB) 72. The line containing the byte addressed by this address, if already in the data cache, is copied to the cache reload buffer. The line containing the byte addressed by this address, if not already in the data cache arrays is copied directly to the cache reload buffer without selecting a line for replacement.

An instruction called Data Cache Rename Reload Buffer (dcrrb) is also provided. Referring again to FIG. 9 for an instruction 62 having a dcrrb opcode 64, the address to which the CRB is to be renamed is computed by adding the contents of register A (RA) 68 and register B (RB) 72. If a line of the data cache array contains the byte addressed by this address, the line is invalidated. The directory entry for the cache reload buffer is marked to indicate that this cache line contains the data for the cache-line-sized block of storage containing the byte addressed, and a line is selected for replacement.

The code for copying a page pointed to by R2 to a page pointed to by R3 is as follows in Table 1. R2 contains the address of the first cache line in the source page and R3 contains the address of the first cache line in the destination page. R4 is used as an index register. The counter (used by the branch and decrement (bdn) instruction) contains the number of lines in the page.

TABLE 1

|  | load | r4,0 | clear index register |
| --- | --- | --- | --- |
| loop: | dcmtrb | (r2,r4) | load line to crb |
|  | dcrrb | (r3,r40) | rename it |
|  | addi | r4,r4,32 | increment index by cache line size |
|  | bdn | loop | branch and decrement counter |

To reiterate, the ability to rename the cache line is achieved since the load/store sequence performed by traditional operating systems to copy data from one location to another doesn't require the copied from data once it has been stored. However, the traditional approach, while not needed this data, resulted in a duplicate copy of the data being maintained in the cache. We have significantly improved the cost/performance of cache based systems by recognizing and eliminating this duplication of data, thus minimizing cache storage inefficiencies as well as minimizes data traffic to/from the cache.

While the invention has been particularly shown and described with reference to a preferred embodiment, it will be understood by those skilled in the art that various changes in form and detail may be made without departing from the spirit and scope of the invention.

We claim:

1. A method of moving data in a data processing system having an interconnection of a processor, main memory, a cache, and cache reload buffer having a directory, to reduce cache miss traffic between the main memory and the cache, comprising the steps of:

loading a line of data with a first address from the main memory or the cache into the cache reload buffer;

loading the first address into the buffer directory;

changing the first address in the buffer directory to a second address; and invalidating any data in the cache having the first address responsive to the changing of the addresses in the buffer directory, the invalidation improving the effective storage efficiency of the cache.

2. The method of claim 1 wherein said step of loading a line of data is initiated by a processing unit instruction.

3. The method of claim 2 wherein said line of data is specified by an operand in said instruction.

4. The method of claim 2 wherein said second address is a value specified by an operand in said instruction.

5. The method of claim 1 wherein said step of loading a line of data into said cache reload buffer is from a cache array storing multiple lines of data.

6. A system for moving data in a data processing system having an interconnection of a processor, main memory, a cache, and cache reload buffer having a directory, to reduce cache miss traffic between the main memory and the cache, comprising:

means for loading a line of data with a first address from the main memory or the cache into the cache reload buffer;

means for loading the first address into the buffer directory;

means for changing the first address in the buffer directory to a second address; and means for invalidating any data in cache having the first address responsive to an address change in the buffer directory by the means for changing, the invalidation improving the effective storage efficiency of the cache.

7. The system of claim 6 wherein said line of data is specified by an operand in a processor instruction.

8. The system of claim 6 wherein said second address is a value specified by an operand in a processor instruction.

9. The system of claim 6 wherein said cache comprises a cache array storing multiple lines of data.

10. A system for moving data in a data processing system to reduce cache miss traffic between a main memory and a cache, comprising:

a CPU;

means, coupled to said CPU, for loading a line of data with a first address from the main memory or the cache of said data processing system into a cache reload buffer;

means for loading the first address into a buffer directory associated with the cache reload buffer;

means, coupled to said CPU, for changing the first address in said buffer directory to a second address; and means for invalidating any data in the cache having the first address responsive to an address change in the buffer directory by the means for changing, the invalidation improving the effective storage efficiency of the cache.

11. In a data processing system having an interconnection of a processor, main memory, a cache array, and a cache reload buffer having a directory, a method for renaming cache lines to improve effective storage efficiency of the cache array, comprising the steps of:

transferring a first line of data with a first address from the cache array to the cache reload buffer;

loading the first address into the buffer directory;

changing the first address to a second address in the buffer directory;

invalidating any line of data in the cache array having the first address responsive to the change of the first address to the second address in the buffer directory, the invalidation making available one or more lines of the cache; and transferring the first line of data with the second address from the cache reload buffer to a line in the cache array responsive to a cache miss.

12. A system to rename cache lines to improve effective storage efficiency of the cache array, comprising:

means for transferring a first line of data with a first address from a cache array to a cache reload buffer;

means for loading the first address into a buffer directory associated with the cache reload buffer;

means for changing the first address to a second address in the buffer directory;

means for invalidating any line of data in the cache array having the first address responsive to the change of the first address to the second address in the buffer directory, the invalidation improving the effective storage efficiency of the cache array; and means for transferring the first line of data with the second address from the cache reload buffer to a line in the cache array responsive to a cache miss.

* * * * *